United States Patent [19]
Natsume

[11] Patent Number: 5,997,190
[45] Date of Patent: Dec. 7, 1999

[54] IMAGE READ APPARATUS, FILM CARTRIDGE HANDLING APPARATUS, AND ADAPTER

[75] Inventor: Masahito Natsume, Matsudo, Japan

[73] Assignee: Canon Kabushiki Kaisha, Tokyo, Japan

[21] Appl. No.: 08/988,813

[22] Filed: Dec. 11, 1997

[30] Foreign Application Priority Data

Dec. 25, 1996 [JP] Japan ................................. 8-345209

[51] Int. Cl.⁶ ........................... G03D 13/00; G03D 13/08
[52] U.S. Cl. ......................... 396/567; 396/638; 396/647; 242/336
[58] Field of Search ..................................... 396/515, 516, 396/567, 578, 638; 355/40, 41, 68, 75; 242/336; 711/115; 364/708.1; 439/377

[56] References Cited

U.S. PATENT DOCUMENTS

| | | | |
|---|---|---|---|
| 3,644,684 | 2/1972 | Tsuji | 379/425 |
| 4,597,058 | 6/1986 | Izumi et al. | 711/115 |
| 4,622,605 | 11/1986 | Tsuruoka et al. | 242/336 |
| 4,941,841 | 7/1990 | Darden et al. | 439/377 |
| 5,677,759 | 10/1997 | Tanimoto et al. | 355/75 |
| 5,687,414 | 11/1997 | Harguchi et al. | 396/515 |

*Primary Examiner*—D. Rutledge
*Attorney, Agent, or Firm*—Morgan & Finnegan LLP

[57] ABSTRACT

An image read apparatus, which reads an image recorded on a film accommodated in a film cartridge having a disk for indicating a development status of the film, detects the development status of the film by using a sensor, and, if the development status detected by the sensor shows undeterminable or a undeveloped state, forcibly controls the disk of the film cartridge to show a developed state.

17 Claims, 12 Drawing Sheets

FIG. 11A
FIG. 11B
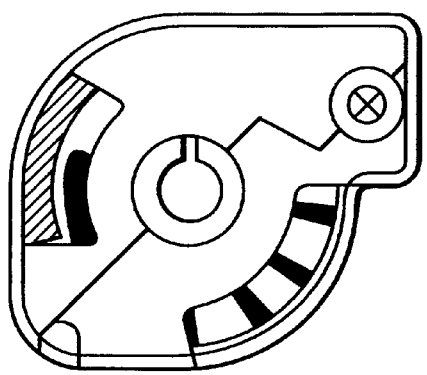
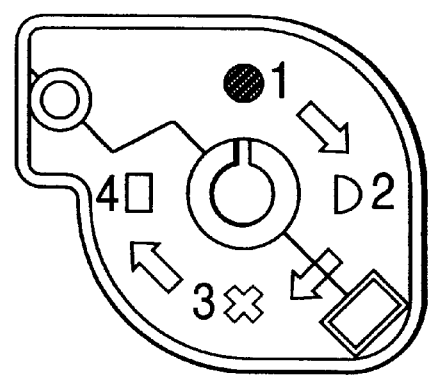
UNUSED
FIG. 12A
FIG. 12B
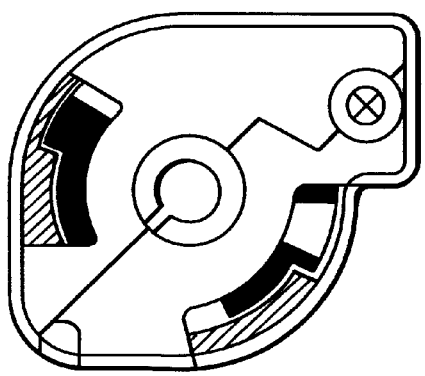
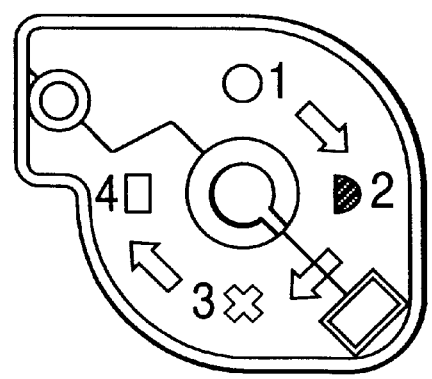
IN USE FIG. 13A          FIG. 13B
 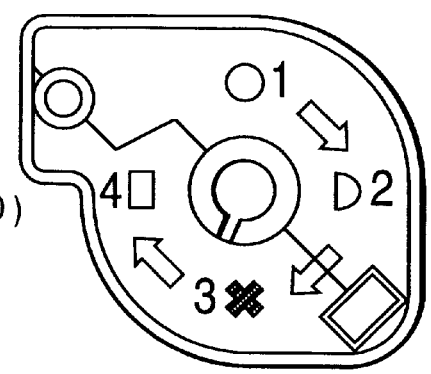
EXPOSURED
(UNDEVELOPED)
FIG. 14A          FIG. 14B
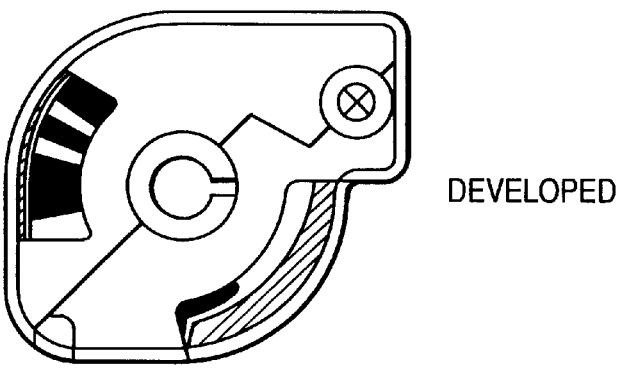 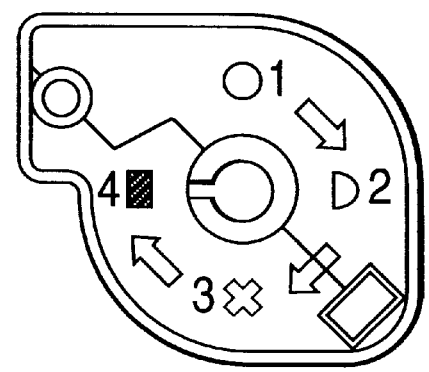
DEVELOPED

IMAGE READ APPARATUS, FILM CARTRIDGE HANDLING APPARATUS, AND ADAPTER

BACKGROUND OF THE INVENTION

The present invention relates to an image read apparatus, a film cartridge handling apparatus, and an adapter and, more particularly, to an image read apparatus for reading image information from a film conforming to, e.g., an advanced photo system (APS™) housed in a film cartridge having a member which shows information on development status of the film which changes in connection with a housed state of the film in the film cartridge, a film cartridge handling apparatus for treating the film cartridge, and an adapter used for setting the film cartridge to, e.g., the image read apparatus.

An APS™ film cartridge accommodating a photographic film and a disk for indicating information on development status (called "development status information" hereinafter) of the accommodated film is well known.

FIGS. 11A to 14B are views showing both of the bases of an APS™ film cartridge. On both bases of the APS™ film cartridge, disks which rotates in connection with a pull-out operation of the film from the film cartridge are provided. FIGS. 11A, 12A, 13A and 14A show one base of the film cartridge, and a film scanner optically senses a pattern appears on this side and determines the utilization and development status of the film. Further, FIGS. 11B, 12B, 13B and 14B show the other base of the film cartridge, and shows the utilization and development status of the film on the basis of which shape; out of a circle, a semicircle, a cross, and a rectangle; has a different color from the others, changed by the disk.

A case shown in FIGS. 11A and 11B indicate an unused state of the film (undeveloped), a case shown in FIGS. 12A and 12B indicate that the film is in use (undeveloped), a case shown in FIGS. 13A and 13B indicate a state that all the frames of the film are exposed but undeveloped, and a case shown in FIGS. 14A and 14B indicate a state that the film is developed.

Further, a system for reading an image from the film accommodated in such the film cartridge by setting the film cartridge to an image read apparatus via a specific adapter is also known.

In the conventional system, for example, the following operation has to be performed before an image is read from a film. First, the film cartridge is set in the adapter, then the adapter is set in the image read apparatus. Thereafter, whether or not the film has been developed or not is checked on the basis of the information indicated by the disk. If it is determined that the film has been developed, then the film is pulled out from the cartridge, whereas, if it is determined that the film has not been developed, then the processing is terminated without pulling out the film from the cartridge.

Further the disks rotate in connection with an accommodated state of the film in the film cartridge, as described above, therefore, when the film is pull out from the film cartridge, the disks show either one of the aforesaid four utilization and development statuses or a status which does not belong to these four states regardless of the actual utilization and development status of the film. Thus, the development status becomes undeterminable when the film is pulled out from the film cartridge.

Therefore, even though the film has actually been developed, if the adapter is accidentally or intentionally taken off from the image read apparatus with the film being pulled out from the film cartridge, the disk may indicates an undeterminable or improper development status. If the adapter with the film cartridge is set in the image read apparatus after that, the image read apparatus determines the film in the film cartridge has not been developed, yet, and terminates the processing immediately. It does not even rewind the film in the film cartridge.

As a result, the film cartridge is left in an abnormal state in which the film is pulled out from the cartridge with the disks indicating an undeterminable or improper development status. If this happens, the film cartridge can not be used in any image read apparatus.

Further, an adapter which is provided with a CPU so as to keep various information on a film cartridge set in the adapter has been considered. In such an adapter, power source for the CPU on the adapter is the main issue. Accordingly, a configuration for providing electric power from an image read apparatus, a configuration for providing a battery in the adapter, and a configuration for supplying electric power to the CPU from an image read apparatus when the adapter is attached to it and from a battery provided in the adapter when the adapter is detached from the image read apparatus are considered.

In the first configuration, however, while the adapter is detached from the image read apparatus, the CPU can not detect or store what kind of process is performed on the film cartridge because electric power is not supplied to the CPU, therefore it is not practical. In the second configuration, if the battery is exhausted, information stored in the CPU is completely lost, thus, it is necessary to exchange batteries frequently. In the third configuration, the aforesaid problems associated with the first and second configurations are overcome, however, when the power source is switched from an external one (i.e., from the image read apparatus) to an internal one (i.e., the battery), a rapid voltage change occurs and the operation of the CPU becomes insecure. Accordingly, a normal operation is not always secured.

SUMMARY OF THE INVENTION

The present invention has been made in consideration of the above situation, and has as its object to provide an image read apparatus and method capable of reading an image from a film stored in a film cartridge whose disks indicate undeterminable or improper development status.

According to the present invention, the foregoing first object is attained by providing an image read apparatus which reads an image recorded on a film accommodated in a film cartridge having an indication means for indicating a development status of the film, the apparatus comprising: detection means for detecting the development status of the film; and control means for, when the development status detected by the detection means shows other than a developed state, forcibly controlling the indication means of the film cartridge to show the developed state.

According to the present invention, the foregoing first object is also attained by providing an image read method for reading an image recorded on a film accommodated in a film cartridge having an indication means for indicating a development status of the film, the method comprising: a detection step of detecting the development status of the film; and a control step of, when the development status detected in the detection step shows other than a developed state, forcibly controlling the indication means of the film cartridge to show the developed state.

With the aforesaid configuration and method, since the film cartridge whose disks indicate an undeterminable or improper development status is forcibly corrected to show the developed state, therefore, an image can be read from the film thereafter.

Preferably, the image read apparatus further comprises confirmation means for asking a permission to forcibly control the indication means of the film cartridge to indicate the developed state if the development status detected by the detection means is other then the developed state, wherein, when no permission is obtained, the control means is disabled.

With the above configuration, the actual development state is confirmed by a user in advance, therefore, the development status of an actually developed film is corrected to the developed state while preventing the development status of an undeveloped film from being improperly changed to the developed state.

It is the second object of the present invention to provide an image read apparatus and method capable of preventing a film cartridge from being detached from an adapter or an adapter from the image read apparatus when the film is pulled out from the film cartridge.

According to the present invention, the foregoing second object is attained by providing the image read apparatus which further comprises lock means for locking the adapter so as to prevent the adapter from being detached from the image read apparatus; and lock control means for controlling the lock means so as to lock the adapter to the image read apparatus while the film is pulled out from the film cartridge, and otherwise, to release the adapter.

The foregoing second object is also attained by providing an adapter having lock means for locking the film cartridge so as to prevent the film cartridge from being detached from the adapter, the image read apparatus which comprises lock control means for controlling the lock means so as to lock the film cartridge to the adapter when the film is pulled out from the film cartridge, and otherwise, to release the film cartridge.

Further, the foregoing second object is also attained by providing the image read method which further comprises a locking step of locking the adapter so as to prevent the adapter from being detached from the image read apparatus; and a releasing step of releasing the adapter when the film is not pulled out from the film cartridge.

With the aforesaid configuration, it is possible to prevent the film cartridge from being detached from the adapter or the adapter from the image read apparatus when the film is pulled out from the film cartridge.

It is the third object of the present invention to provide an adapter which overcomes the aforesaid problems relating to power source in a case where the adapter includes a CPU for storing various information.

According to the present invention, the foregoing third object is attained by providing an adapter for providing a film cartridge to an external device, the adapter comprising: reading means for reading information from the film cartridge; storage means for storing information read by the reading means; power supply means for supplying electric power to the storage means; connection means for connecting to an external power supply; switch means for selecting either the power supply means or the connection means to provide electric power to the storage means; control means for controlling operation of the switch means; and a condenser, provided between the switch means and the storage means, for stabilizing a supplied voltage, wherein the control means controls the switch means to select the connection means when the adapter is attached to the external device, whereas select the power supply means when the adapter is detached from the external device.

With the above configuration, while saving electric power of the battery provided in the adapter, it is possible to steadily provide electric power to the CPU for a long period.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 11A and 11B are views showing the "unused" state an film cartridge conforming to the advanced photo system;

FIGS. 12A and 12B are views showing the "in use" state of the film cartridge conforming to the advanced photo system;

FIGS. 13A and 13B are views showing the "exposed-undeveloped" state of the film cartridge conforming to the advanced photo system; and FIGS. 14A and 14B are views showing the "developed" state of the film cartridge conforming to the advanced photo system.

DETAILED DESCRIPTION OF THE PREFERRED EMBODIMENTS

Preferred embodiments of the present invention will be described in detail in accordance with the accompanying drawings.

<First Embodiment>

Figure 1:
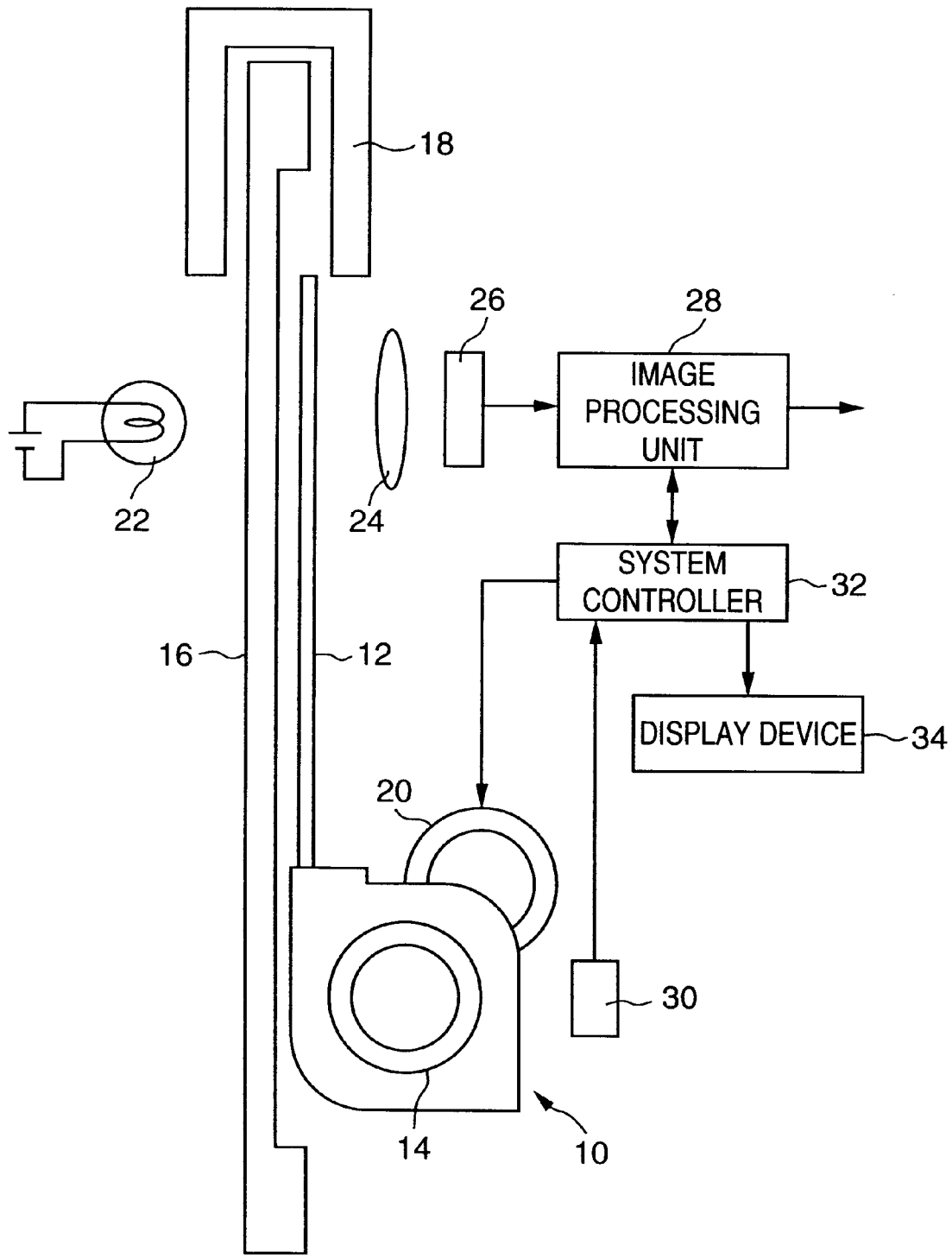
FIG. 1 is a block diagram illustrating a brief configuration of an adapter and an image read apparatus according to a first embodiment of the present invention.

FIG. 1 is a block diagram illustrating a brief configuration of an adapter and an image read apparatus according to the first embodiment of the present invention.

In FIG. 1, reference numeral 10 denotes a film cartridge (simply referred to as "cartridge" hereinafter), which accommodates a film 12 and a disk 14, rotates in connection with the film 12, which shows development status information in an external part of the film cartridge. The cartridge 10 is set in an adapter 16, and the adapter 16 is attached to an attachment unit 18 of an image read apparatus. Further, reference numeral 20 denotes a feeding motor for pulling out the film 12 from the cartridge 10 and, inversely, winding the film 12 into the cartridge 10.

An illumination light source 22 is placed on one side of the film 12 which is pulled out from the cartridge, and a lens 24 and an image read sensor 26 (line sensor or area sensor) are provided on the other side of the film 12. Reference numeral 28 denotes an image processing unit for applying image processes to output signals from the image read sensor 26; 30, a sensor for detecting development status information shown by the disk 14 of the cartridge 10; 32, a system controller for controlling the overall operation; and 34, a display device for displaying various information, such as a predetermined warning.

Figure 2:
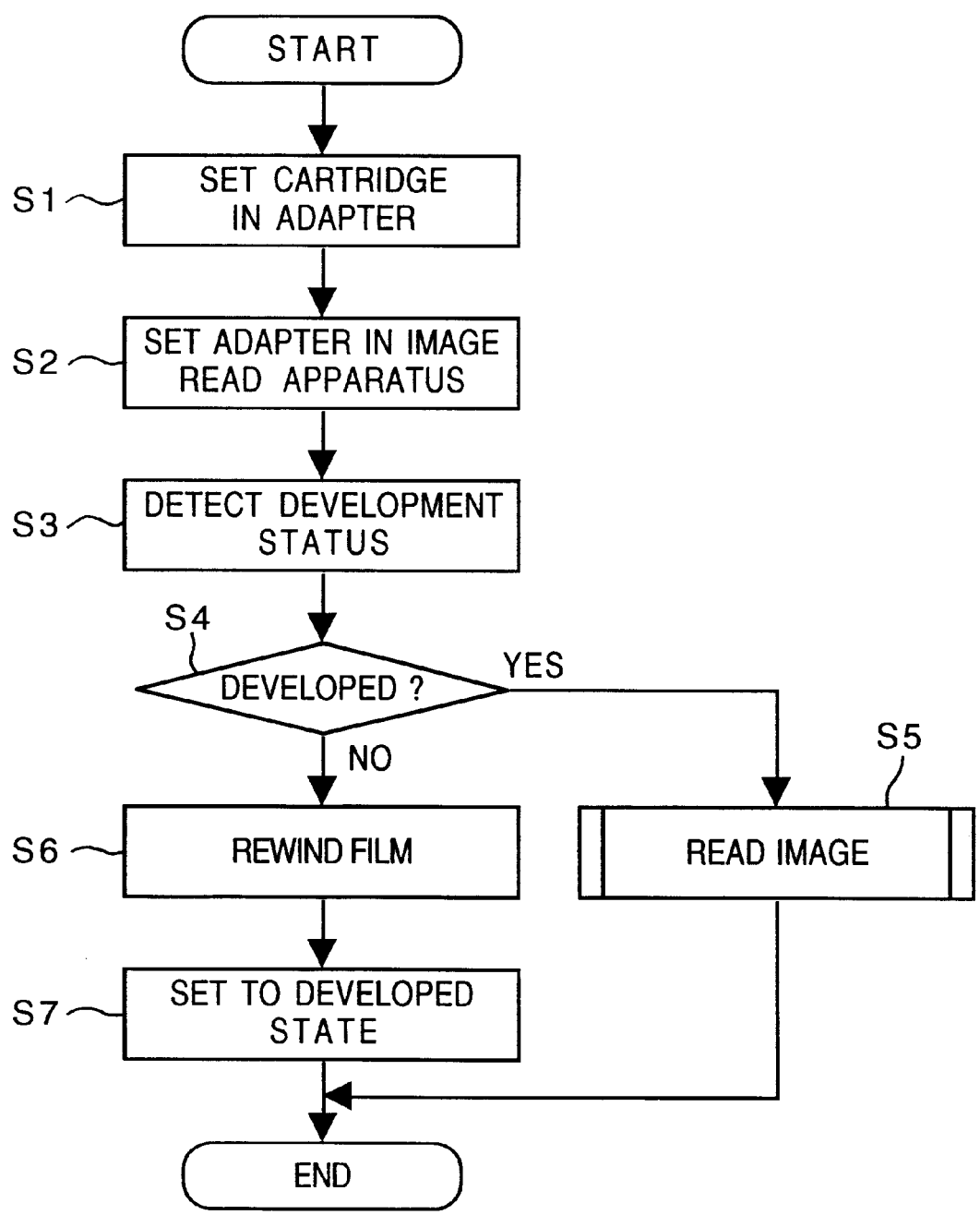
FIG. 2 is a flowchart showing an operation of the configuration shown in FIG. 1.

FIG. 2 is a flowchart showing an operation of the adapter and the image read apparatus according to the first embodiment. First, a user sets the cartridge 10 in the adapter 16 in step S1, then sets the adapter 16 in the attachment unit 18 in step S2. The sensor 30 detects development status information from the disk 14 of the set cartridge 10 and informs the detected result to the system controller 32 in step S3.

When the detected result by the sensor 30 shows "developed", namely YES in step S4, the system controller 32 pulls out the film 12 from the cartridge 10 and reads an image in step S5. More specifically, the system controller 32 controls the feeding motor 20 to pull out the film from the cartridge 10. Note, since the disk 14 moves in connection with the film 12, after the film 12 is pulled out from the cartridge 10, the disk 14 indicates an undeterminable or improper development status as the development status information. The pulled-out film 12 is illuminated by the illumination light source 22, and an image on the film 12 is formed on the image read sensor 26 via the lens 24. The image read sensor 26 converts an optical image into an electric signal, and the output electric signal is processed by the image processing unit 28, and outputted to outside as an image signal in a predetermined format or in a data format suitable to a computer, for example.

If the output from the sensor 30 indicates either an undeterminable development status or an undeveloped state in step S4, namely, "NO" in step S4, then the system controller 32 controls the feeding motor 20 to rewind the film 12 into the cartridge 10 in step S6. At this time, the film 12 is rewound until the disk 14, which rotates as the film 12 is wound, indicates a developed state. As a result, the cartridge 10 is set to the developed state in step S7.

According to the first embodiment as described above, when the adapter 16 is detached from the attachment unit 18 accidentally or erroneously with the film 12 being pulled out from the cartridge 10, for example, which causes the disk 14 to indicate an undeterminable development status or an undeveloped state with the film 12 being pulled out from the cartridge, the aforesaid abnormal state of the cartridge is restored to a normal state.

Figure 3:
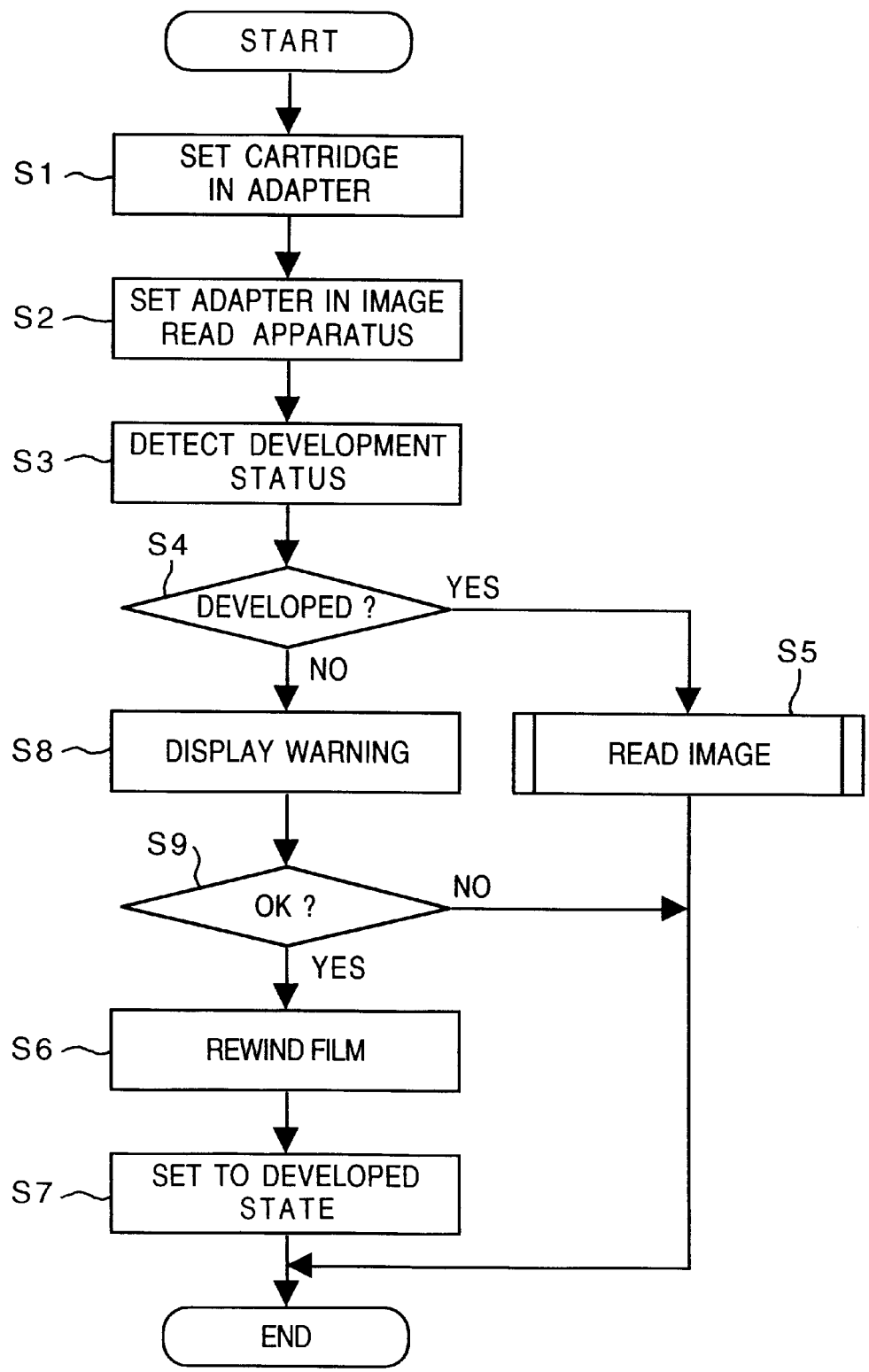
FIG. 3 is a flowchart showing another operation of the configuration shown in FIG. 1.

However, it is not preferable to force the disk 14 to indicate the developed state if the film 12 is not actually developed, yet. In such a case, as shown in Fig. 3, it is possible to configure the image read apparatus so that, when the disk 14 does not indicate the developed state in step S4 (i.e., NO in step S4), a warning for setting the disk 14 to the developed state is displayed on the display device 34 in step S8, and after a confirmation for setting to the developed state is received from the user in step S9, the film 12 is rewound (step S6) until the disk 14 shows the developed state (step S7).

With the configuration as described above, since the film 12 is rewound after the actual development status of the film 12 is confirmed by the user, if the film 12 is not developed, yet, it is possible to prevent rewinding of the undeveloped film 12 thus showing an improper developed state.

Note, in the above first embodiment, an adapter is attached to an image read apparatus, however, the present invention is not limited to this, and it is possible to configure a film cartridge handling apparatus, having the attachment unit 18, the feeding motor 20, the sensor 30, the system controller 32, and the display unit 34 shown in FIG. 1, for exclusive use for forcibly setting the development status shown by the disk on the cartridge to a developed state by rewinding the film.

<Second Embodiment>

Next, a second embodiment will be explained.

Figure 4:
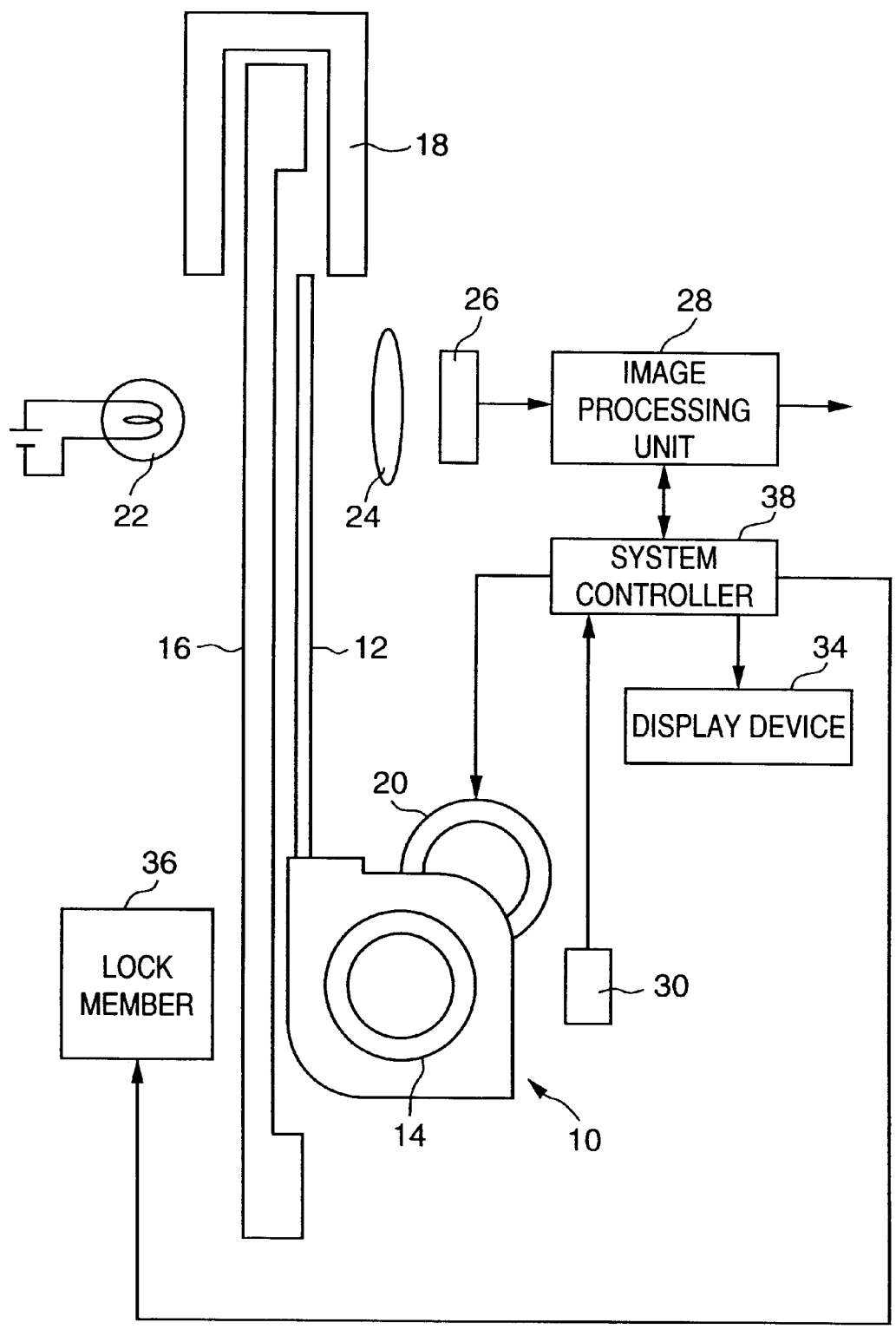
FIG. 4 is a block diagram illustrating a brief configuration of an adapter and an image read apparatus according to a second embodiment of the present invention.

FIG. 4 is a block diagram illustrating a brief configuration of an adapter and an image read apparatus according to the second embodiment of the present invention. In FIG. 4, the same units and elements as those in FIG. 1 are referred by the same reference numerals, and explanation of those are omitted. In the second embodiment, a lock member 36 which prevents the adapter 16, attached to the attachment unit 18, from being detached from the attachment unit 18. A system controller 38 controls to lock and release by the lock member 36 for locking and releasing the adapter 16.

Figure 5:
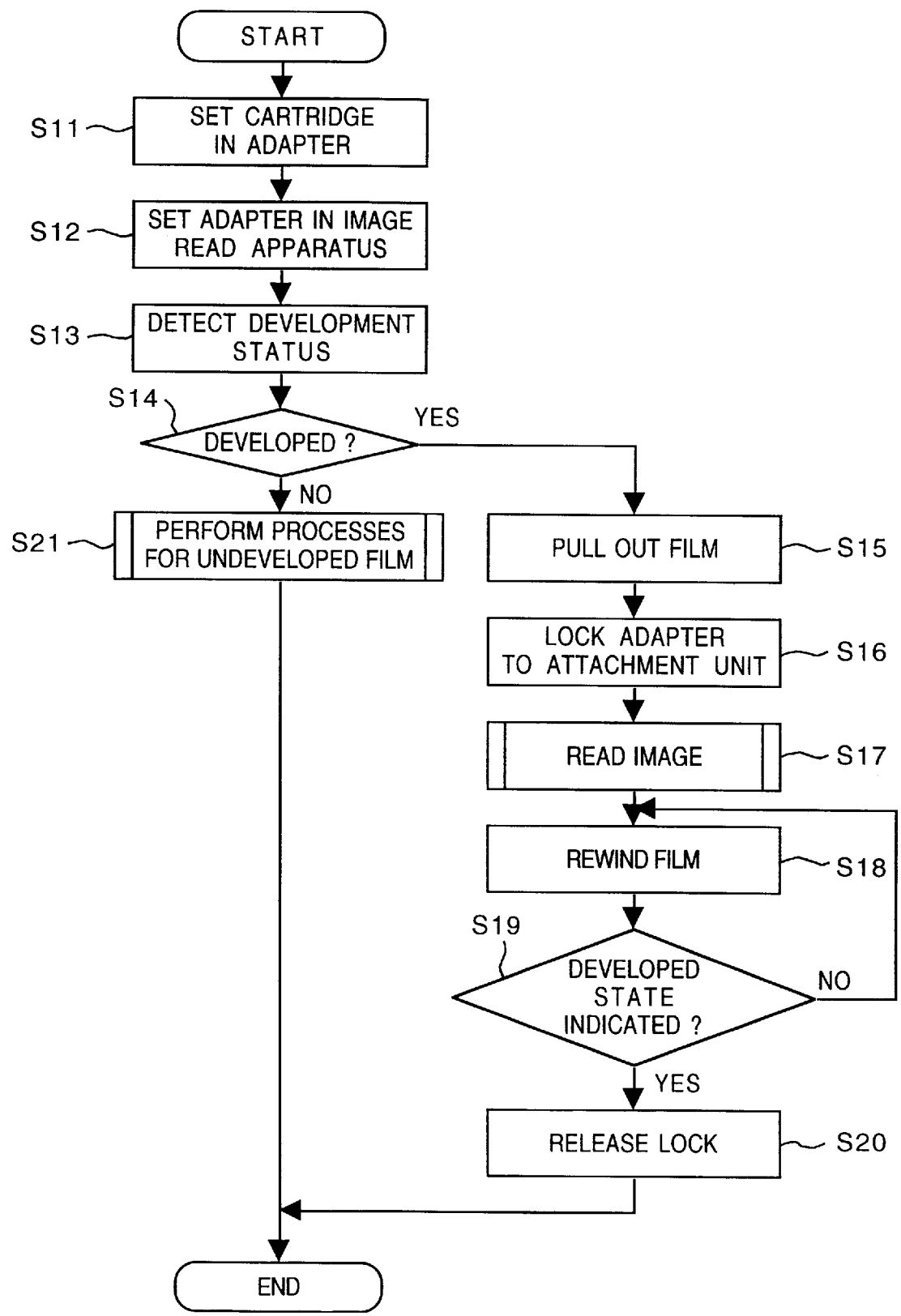
FIG. 5 is a flowchart showing an operation of the configuration shown in FIG. 4.

FIG. 5 is a flowchart showing an operation of the adapter and the image read apparatus shown in FIG. 4 according to the second embodiment of the present invention. A user sets the cartridge 10 in the adapter 16 in step S11, then sets the adapter 16 in the attachment unit 18 in step S12. The sensor 30 detects the development status information indicated by the disk 14, and informs the detected result to the system controller 38 in step S13.

When the detected result by the sensor 30 indicates the developed state in step S14, then the system controller 38 controls the feeding motor 20 to pull out the film 12 from the cartridge 10 in step S15. Then the process proceeds to step S16, where the adapter 16 is locked by the lock member 36 at the position in step S16. Thereafter, an image is read from the film 12 in step S17. Note, since the disk 14 moves in connection with the film 12, after the film 12 is pulled out from the cartridge 10, the disk 14 indicates an undeterminable or improper development status as the development status information. After a desired image is read in step S17, then the system controller 38 controls the feeding motor 20 to rewind the film 12 into the cartridge 10 in step S18. Then the process proceeds to step S19 where whether or not the disk 14 indicates the developed state, namely, whether or not the output from the sensor 30 indicates the developed state is determined. If NO, then the process returns to step S18. Whereas, if YES, then the process proceeds to step S20 where the system controller 38 controls to release the lock member 36.

By locking the cartridge 10, from which the film 12 is pulled out, by the lock member 36 before reading the image, it is possible to keep the adapter 16 having the film cartridge 10 with the film 12 being pulled out, from detaching from the attachment unit 18 accidentally or erroneously. Accordingly, it is possible to prevent the film cartridge 10 from being in an abnormal state, namely, a state in which the film 12 is pulled out while the disk 14 shows an undeterminable or improper development status.

In a case where the output from the sensor 30 shows an undeterminable development status or an undeveloped state in step S14, the system controller 38 performs predetermined processes for an undeveloped film in step S21 which corresponds to processes in steps S6 and S7 in FIG. 2 or in steps S8 to S10 in FIG. 3.

<Modification of the Second Embodiment>

Figure 6:
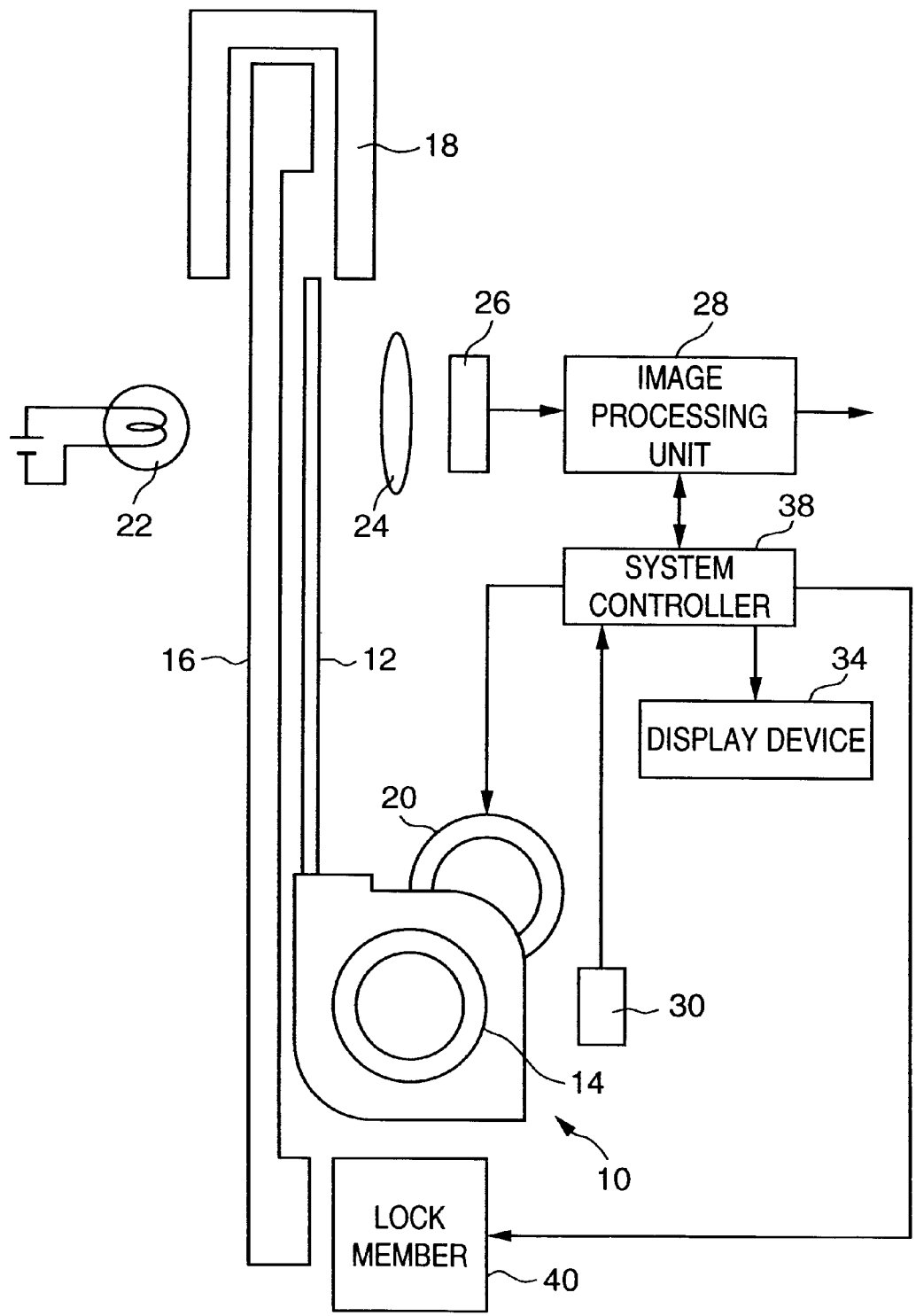
FIG. 6 is a block diagram illustrating a configuration of an adapter and an image read apparatus according to a modification of the second embodiment.
Figure 7:
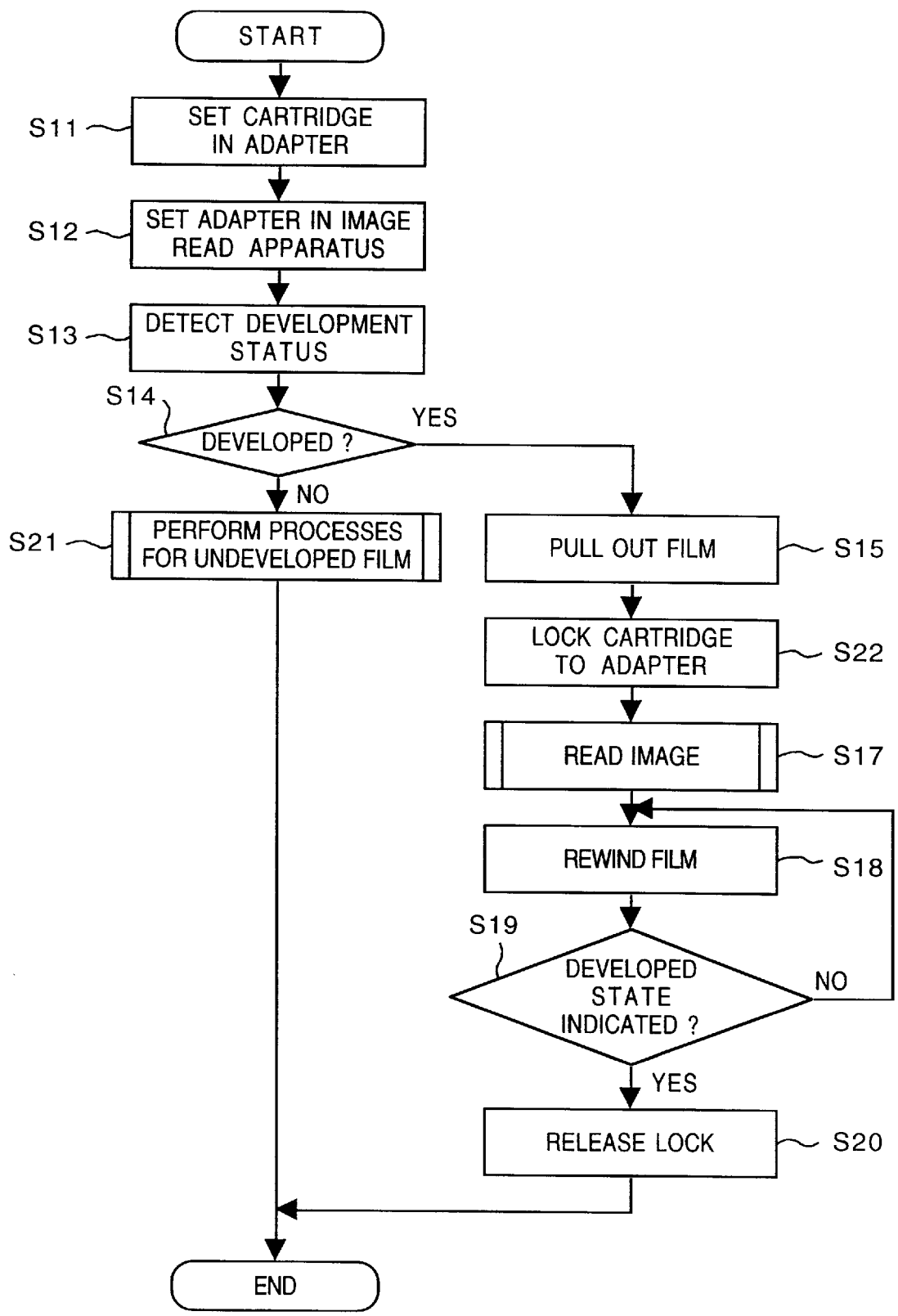
FIG. 7 is a flowchart showing an operation of the configuration shown in FIG. 6.

In the second embodiment, the lock member 36 for locking the adapter 16 to the attachment unit 18 is provided, as shown in FIG. 4, however, the present invention is not limited to this, and the film cartridge 10 may be locked to the adapter 16. FIG. 6 is a block diagram illustrating a configuration of an adapter and an image read apparatus according to a modification of the second embodiment. Further, FIG. 7 is a flowchart showing an operation of the adapter and the image read apparatus, shown in FIG. 6, according to the modification of the second embodiment of the present invention. In FIG. 6, reference numeral 40 denotes a lock member for locking the cartridge 10 to the adapter 16. Except the film cartridge 10 is locked to the adapter 16 instead of locking the adapter 16 to the attachment unit 18 (step S22), other units and elements, and the operation of the adapter and the image read apparatus are the same as those explained with reference to FIGS. 4 and 5.

According to the modification of the second embodiment, it is possible to prevent the cartridge 10 from being detached accidentally or erroneously from the adapter 16 with the film 12 being pulled out from the cartridge 10. Accordingly, it is possible to prevent the film cartridge 10 from being in an abnormal state, namely, a state in which the film 12 is pulled out while the disk 14 shows an undeterminable or improper development status.

<Third Embodiment>

Next, an embodiment of an adapter is explained in a third embodiment. An adapter which is provided with a CPU so as to keep various information on the film cartridge set in the adapter has been considered. In such adapter, a power source for the CPU on the adapter is the main issue. Accordingly, a configuration for providing electric power from an image read apparatus, a configuration for providing a battery in the adapter, and a configuration for supplying electric power to the CPU from an image read apparatus when the adapter is attached to it and from a battery provided in the adapter when the adapter is detached from the image read apparatus are considered.

In the first configuration, however, while the adapter is detached from the image read apparatus, the CPU can not detect or store what kind of process is performed on the film cartridge because electric power is not supplied to the CPU, therefore it is not practical. In the second configuration, if the battery is exhausted, information stored in the CPU is completely lost, thus, it is necessary to exchange batteries frequently. In the third configuration, the aforesaid problems associated with the first and second configurations are overcome, however, when the power source is switched from an external one (i.e., from the image read apparatus) to an internal one (i.e., the battery), a rapid voltage change occurs and the operation of the CPU becomes insecure. Accordingly, a normal operation is not always secured.

Figure 8:
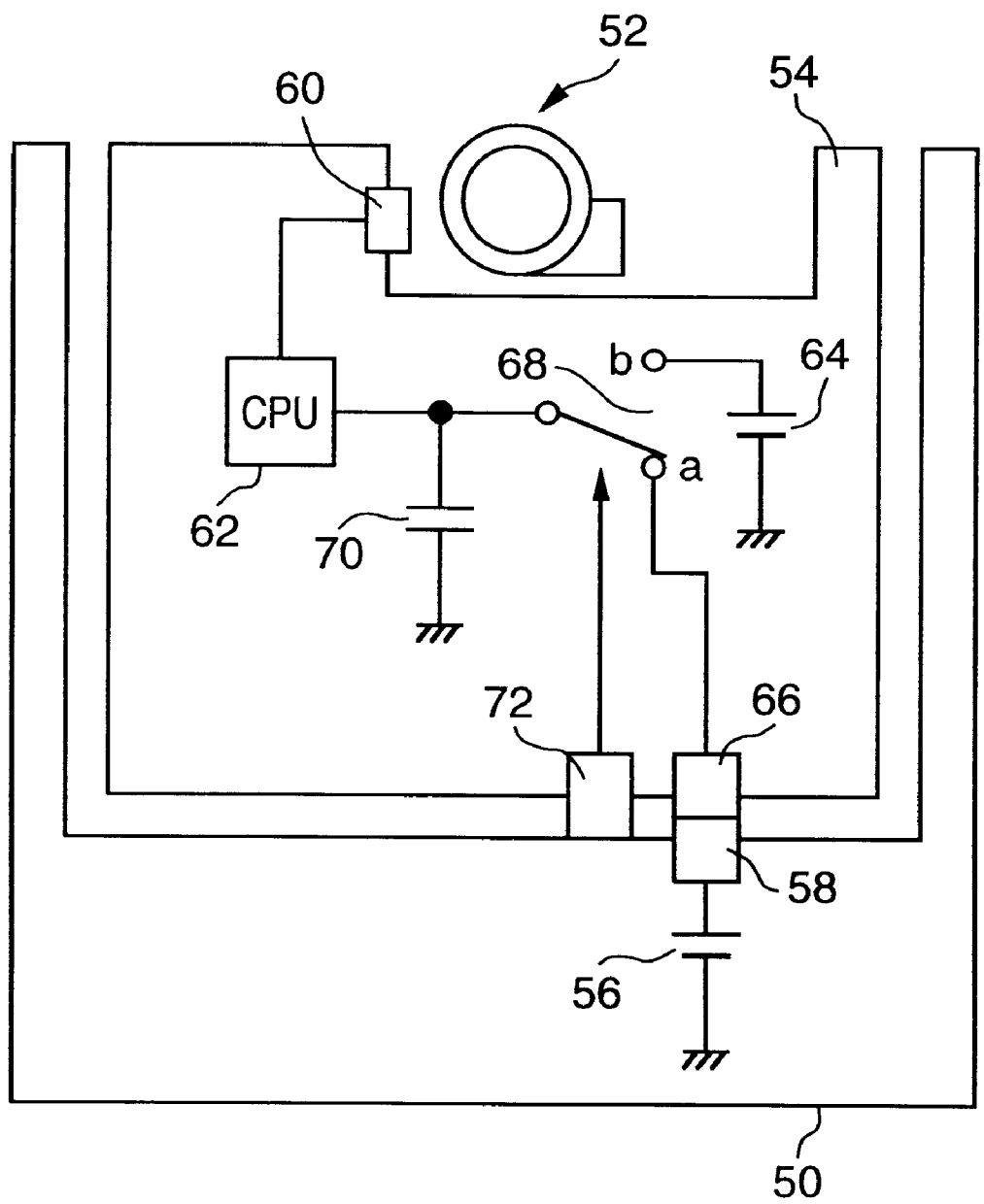
FIG. 8 is a block diagram illustrating a brief configuration of an adapter having a CPU according to a third embodiment.
Figure 9:
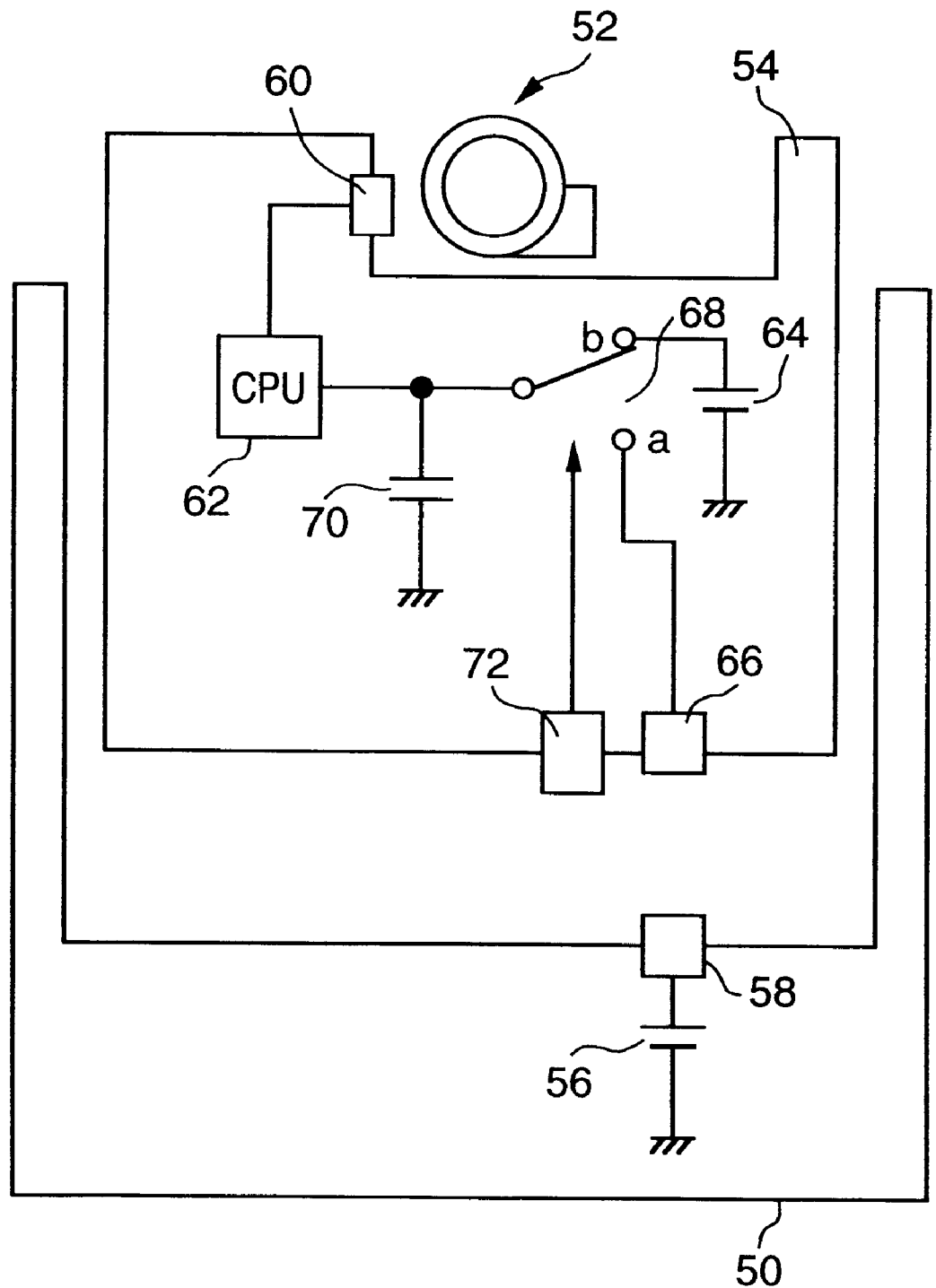
FIG. 9 is a block diagram illustrating a brief configuration of the adapter having the CPU according to the third embodiment.
Figure 10:
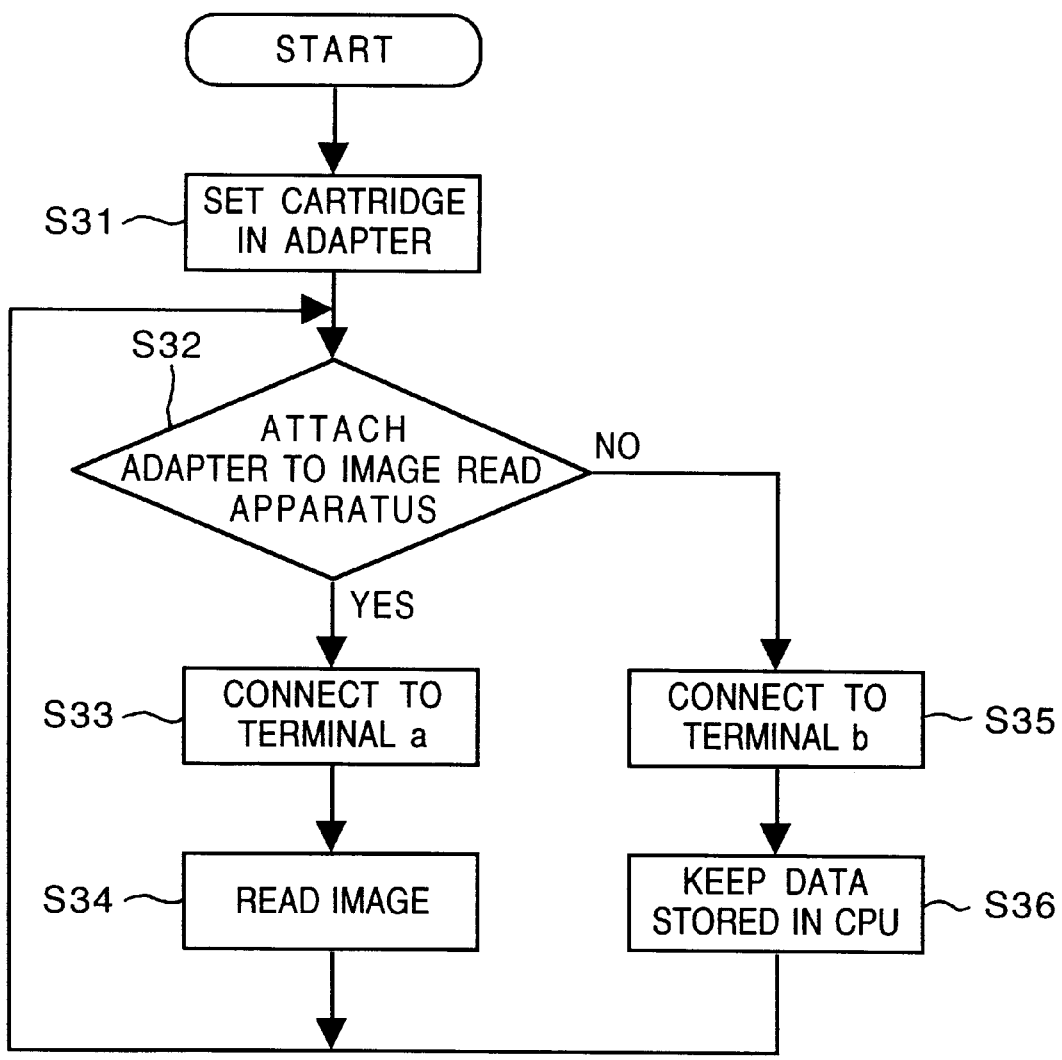
FIG. 10 is a flowchart showing an operation of the adapter shown in FIGS. 9 and 10 according to the third embodiment of the present invention.

In the third embodiment, an adapter which overcomes the problems of the third configuration is explained. FIGS. 8 and 9 are block diagrams illustrating brief configurations of the adapter according to the third embodiment. Especially, FIG. 8 shows a state in which the adapter is attached to an image read apparatus, and FIG. 9 shows a state in which the adapter is detached from the image read apparatus. Further, FIG. 10 is a flowchart showing an operation of the adapter and the image read apparatus according to the third embodiment.

In FIGS. 8 and 9, reference numeral 50 denotes an image read apparatus; 52, a film cartridge; and 54, an adapter used to set the film cartridge 52 in the image read apparatus 50 to read an image recorded on the film. The image read apparatus 50 has a power supply connection terminal 58 for providing electric power from an internal power source 56 to the adapter 54.

The adapter 54 has a data read sensor 60 for sensing information indicated by a disk of the film cartridge 52 and a CPU 62 for processing data sensed by the data read sensor 60 and storing it. The adapter 54 further includes an internal battery 64, a power supply connection terminal 66 for connecting to the power supply connection terminal 58 of the image read apparatus 50, and a switch 68 for selecting either an output voltage from the internal battery 64 (terminal b in FIG. 8) or an output voltage supplied via the power supply connection terminal 66 (terminal a in FIG. 8). These elements are for supplying electric power to the CPU 62.

The output terminal of the switch 68 connects to the power supply input terminal of the CPU 62, and at the same time, is grounded via a filter condenser 70. Further reference numeral 72 denotes a sensor (e.g., a microswitch) for detecting whether or not the adapter 54 is connected to the image read apparatus 50. When the adapter 54 is connected to the image read apparatus 50, the switch 68 is switched to the terminal a (i.e., to the power supply connection terminal 66), and otherwise, it connects to the terminal b (i.e., to the internal battery 64).

Next, an operation of the image read apparatus and the adapter is explained with reference to the flowchart shown in FIG. 10. First, the film cartage 52 is set in the adapter 54 in step S31, then the adapter 54 is attached to the image read apparatus 50. When the sensor 72 senses that the adapter 54 is attached to the image read apparatus 50 in step S32, it controls the switch 68 to connect to the terminal a (i.e., to the power supply connection terminal 66) in step S33. Accordingly, the electric power is supplied to the CPU 62 from the power source 56 of the image read apparatus 50. The CPU 62 takes the information on the film cartridge 52 sensed by the data read sensor 60, processes it, then stores it. While the electric power to the CPU 62 is supplied from the image read apparatus 50, the internal battery 64 is disconnected, therefore, power of the internal battery 64 is not consumed.

When the adapter 54 is detached from the image read apparatus 50 in step S32, then the sensor 72 controls the switch 68 to switch to the terminal b (i.e., to the internal battery 64) in step S35. Thereafter in step S36, data stored in the CPU 62 is retained. Accordingly, the output voltage supplied from the internal battery 64 is applied to the CPU 62. Due to the changeover operation of the switch 68 at this time, the voltage applied to the power supply input terminal of the CPU 62 becomes unstable in general. However, in the third embodiment, the filter condenser 70 stabilizes the voltage at this time to the level which does not affect the operation of the CPU 62. As a result, the CPU 62 can continuously store the information of the film cartridge detected by the data read sensor 60.

As described above, the adapter 54 is either attached or detached to/from the image read apparatus 50, the CPU 62 is always supplied with necessary electric power from either the image read apparatus or the internal battery 64. Furthermore, since the filter condenser 70 stabilizes the instability of voltage when changing the power sources, the CPU 62 is able to operate steadily.

Note, in the above third embodiment, the switch 68 is switched in response to an output from the data read sensor 72, however, the present invention is not limited to this. For example, it is possible to configure the adapter 54 so that the switch 68 is mechanically changed over in response to the attachment and detachment of the adapter 54 to/from the image read apparatus 50.

According to the third embodiment as described above, while saving the power of a battery provided in an adapter, it is possible to steadily provide electric power to the CPU for a long time.

The present invention is not limited to the above embodiments and various changes and modifications can be made within the spirit and scope of the present invention. Therefore to appraise the public of the scope of the present invention, the following claims are made.

What is claimed is:

1. An image read apparatus which reads an image recorded on a film accommodated in a film cartridge having indication means for indicating a development status of the film, said apparatus comprising:

detection means for detecting the development status of the film:

control means for, when the development status detected by said detection means shows other than a development state, forcibly controlling the indication means of the film cartridge to show the developed state; and confirmation means for asking a permission to forcibly control the indication means of the film cartridge to indicate the developed state if the development status detected by said detection means is other then the developed state, wherein, when no permission is obtained, said control means is disabled.

2. The image read apparatus according to claim 1, wherein said control means forcibly controls the indication means of the film cartridge to show the developed state by rewinding the film into the film cartridge.

3. The image read apparatus according to claim 1, wherein the film cartridge is attached to the image read apparatus via an adapter.

4. The image read apparatus according to claim 2 further comprising lock means for locking the adapter so as to prevent the adapter from being detached from the image read apparatus; and lock control means for controlling said lock means so as to lock the adapter to the image read apparatus while the film is pulled out from the film cartridge, and otherwise, to release the adapter.

5. The image read apparatus according to claim 2, wherein the adapter has lock means for locking the film cartridge so as to prevent the film cartridge from being detached from the adapter, and the image read apparatus further comprises lock control means for controlling said lock means so as to lock the film cartridge to the adapter when the film is pulled out from the film cartridge, and otherwise, to release the film cartridge.

6. A cartridge handing apparatus which reads an image recorded on a film accommodated in a film cartridge having indication means for indicating a development status of the film, said apparatus comprising:

detection means for detecting the development status of the film;

control means for, when the development status detected by said detection means shows other than a developed state, forcibly controlling the indication means of the film cartridge to show the developed state; and confirmation means for asking a permission to forcibly control the indication means of the film cartridge to indicate the developed state if the development status detected by said detection means is other than the developed state, wherein, when no permission is obtained, said control means is disabled.

7. The cartridge handling apparatus according to claim 5, wherein said control means forcibly controls the indication means of the film cartridge to show the developed state by rewinding the film into the film cartridge.

8. The cartridge handling apparatus according to claim 5, wherein the film cartridge is attached to the cartridge handling apparatus via an adapter.

9. The cartridge handling apparatus according to claim 6 further comprising lock means for locking the adapter so as to prevent the adapter from being detached from the cartridge handling apparatus; and lock control means for controlling said lock means so as to lock the adapter to the cartridge handling apparatus while the film is pulled out from the film cartridge, and otherwise, to release the adapter.

10. The cartridge handling apparatus according to claim 6, wherein the adapter has lock means for locking the film cartridge so as to prevent the film cartridge from being detached from the adapter, and the cartridge handling apparatus further comprises lock control means for controlling said lock means so as to lock the film cartridge to the adapter when the film is pulled out from the film cartridge, and otherwise, to release the film cartridge.

11. An image read method for reading an image recorded on a film accommodated in a film cartridge having indication means for indicating a development status of the film, said method comprising:

a detection step of detecting the development status of the film:

a control step of, when the development status detected in said detection step shows other than a developed state, forcibly controlling the indication means of the film cartridge to show the developed state, and a confirmation step for permission to forcibly control the indication means of the film cartridge to indicate the developed state if the development status detected in said detection step is other than the developed state, wherein, when no permission is obtained, said control step is disabled.

12. The image read method according to claim 9, wherein, in said control step, the indication means of the film cartridge is forcibly controlled to show the developed state by rewinding the film into the film cartridge.

13. The image read method according to claim 9, wherein the film cartridge is attached to an image read apparatus for reading an image recorded in the film via an adapter.

14. The image read method according to claim 13 further comprising a locking step of locking the adapter so as to prevent the adapter from being detached from the image read apparatus; and a releasing step of releasing the adapter when the film is not pulled out from the film cartridge.

15. An adapter for providing a film cartridge to an external device, said adapter comprising:

reading means for reading information from the film cartridge;

storage means for storing information read by said reading means;

power supply means for supplying electric power to the storage means;

connection means for connecting to an external power supply;

switch means for selecting either said power supply means or said connection means to provide electric power to said storage means;

control means for controlling operation of said switch means; and a condenser, provided between said switch means and said storage means, for stabilizing a supplied voltage, wherein said control means controls said switch means to select said connection means when the adapter is attached to the external device, whereas select said power supply means when the adapter is detached from the external device.

16. The adapter according to claim 15, wherein said control means has a sensor for detecting whether the adapter is connected to the external device or not.

17. The adapter according to claim 15, wherein said control means is configured to mechanically control said switch means.

* * * * *

UNITED STATES PATENT AND TRADEMARK OFFICE
CERTIFICATE OF CORRECTION

PATENT NO.   : 5,997,190
DATED        : December 7, 1999
INVENTOR(S)  : Masahito Natsume It is certified that error appears in the above-identified patent and that said Letters Patent is hereby corrected as shown below:

Specification,
Column 8,
Lines 21, 34, and 54, please delete "b" after "terminal" and insert therefor -- $\underline{b}$ --.
Lines 22, 33, and 42, please delete "a" after "terminal" and insert therefor -- $\underline{a}$ --.

Claim 4, column 9,
Line 47, delete "claim 2" and insert therefor -- claim 3 --.

Claim 5, column 9,
Line 55, delete "claim 2" and insert therefor -- claim 3 --.

Claim 7, column 10,
Line 14, delete "claim 5" and insert therefor -- claim 6 --.

Claim 8, column 10,
Line 18, delete "claim 5" and insert therefor -- claim 6 --.

Claim 9, column 10,
Line 21, delete "claim 6" and insert therefor -- claim 8 --.

Claim 10, column 10,
Line 30, delete "claim 6" and insert therefore -- claim 8 --.

UNITED STATES PATENT AND TRADEMARK OFFICE
CERTIFICATE OF CORRECTION

PATENT NO. : 5,997,190
DATED : December 7, 1999
INVENTOR(S) : Masahito Natsume

It is certified that error appears in the above-identified patent and that said Letters Patent is hereby corrected as shown below:

<u>Claim 12, column 10,</u>
Line 55, delete "claim 9" and insert therefor -- claim 11 --.

<u>Claim 13, column 10,</u>
Line 59, delete "claim 9" and insert therefor -- claim 11 --.

Signed and Sealed this

Twenty-fifth Day of September, 2001

*Attest:*

*Attesting Officer*

NICHOLAS P. GODICI
*Acting Director of the United States Patent and Trademark Office*